US005413443A

United States Patent [19]

Aghamehdi

[11] Patent Number: 5,413,443

[45] Date of Patent: May 9, 1995

[54] METHOD AND APPARATUS FOR MOUNTING AN INSULATOR THREAD ONTO A PIN OF A POWER LINE

[75] Inventor: Hossein Aghamehdi, Lancaster, Pa.

[73] Assignee: Joslyn Manufacturing Co., Chicago, Ill.

[21] Appl. No.: 125,626

[22] Filed: Sep. 22, 1993

[51] Int. Cl.[6] ........ F16B 35/02; F16B 35/04; H01B 17/16

[52] U.S. Cl. ........ 411/383; 411/424; 411/902; 411/908; 174/165

[58] Field of Search ........ 411/383, 392, 411, 424, 411/901, 902, 907, 908; 174/165

[56] References Cited

U.S. PATENT DOCUMENTS

| | | | |
|---|---|---|---|
| 1,880,766 | 10/1932 | Burke | 174/165 X |
| 2,191,152 | 2/1940 | Hammel . | |
| 2,297,600 | 9/1942 | Williams | 174/165 X |
| 2,870,244 | 1/1959 | Jellyman et al. | 174/165 |
| 3,001,005 | 9/1961 | Sonnenberg . | |
| 3,242,446 | 3/1966 | Leute . | |
| 3,329,765 | 7/1967 | Jublin et al. . | |
| 3,531,580 | 9/1970 | Foster . | |
| 3,585,278 | 6/1971 | Quirk . | |
| 4,047,790 | 9/1977 | Carino . | |
| 4,339,630 | 7/1982 | McQuay . | |
| 4,563,545 | 1/1986 | Dzomba . | |
| 4,718,801 | 1/1988 | Berecz | 411/901 X |
| 4,824,314 | 4/1989 | Stencel | 411/424 X |
| 4,973,798 | 11/1990 | Parraud et al. . | |
| 5,130,495 | 7/1992 | Thompson . | |

*Primary Examiner*—Neill R. Wilson
*Attorney, Agent, or Firm*—Ratner & Prestia

[57] ABSTRACT

In a unit for mounting a primary insulator for power lines onto a pin, a threaded element has an inner diameter which decreases along the length of the threaded element from its top to bottom. The threaded element surrounds a portion of the pin, forming a gap defined by the outer peripheral surface of the pin and the inner diameter of the threaded element. An adhesive resinous material, such as epoxy, is permitted to cure within the gap and forms a strong bond with the pin, which may be metal or fiberglass. An interference fit, or interlock, is formed between the threaded element and the adhesive resinous material. The threaded element may be plastic, and a lubricating powder may be dispersed throughout the threaded element.

13 Claims, 4 Drawing Sheets

METHOD AND APPARATUS FOR MOUNTING AN INSULATOR THREAD ONTO A PIN OF A POWER LINE

FIELD OF THE INVENTION

The present invention pertains to a method and apparatus for mounting a threaded element, for supporting a primary insulator of a power line, onto a pin.

BACKGROUND OF THE INVENTION

Power lines (also known as "conductors") are supported by power line poles, which may be wooden, metal or other typically used materials. The power lines, such as electrical transmission or distribution lines, are mounted to primary insulators. Primary insulators are typically made of a ceramic material or a synthetic polymer material and have various shapes and designs depending on the required voltage rating. The interior of the primary insulator is typically threaded in order to mate with a threaded element (also known as an "insulator thread") in accordance with the dimensions specified by ANSI C 135.17 (1988), either for a one inch or a one and three-eighths inch thread.

The threaded element, with which the primary insulator mates, is typically formed on a pin, which is directly or indirectly mounted to the power line pole. As used herein, the term "pin" includes any conventionally used rod-like element adapted for insertion into the interior of a threaded element for a primary insulator. Known pins include brackets, spacers, attachments and the like. Pins are usually metal or fiberglass or fiberglass with metal ends and can be mounted at the top of a power line pole (i.e. pole-top pin) or on the side of a power line pole (i.e. side pole pin).

There are a variety of ways to mount a pin to a power line pole. For example, FIG. 4 shows a metal pin 41 having a square neck 46 and a flat circular head 48 for an increased bearing surface. Flat head 48 rests against the top of a wooden cross arm while square washer 52 bears against the bottom of the wooden cross arm by tightening square nut 54 along straight threading 50. Alternatively, FIG. 1 shows a cast metal pin 18 which can be mounted to a power line pole in a known manner. For example, a fiberglass rod (not shown) is firmly mounted to the power line pole at one end by using a base structure, and the other end of the rod fits within bore 16, which is defined by perimeter 14.

Regardless of whether a metal pin or a fiberglass pin is used, a threaded element having dimensions in accordance with ANSI C 135.17 (1988) must be affixed to the top of the pin for engaging and supporting a primary insulator. For example, FIG. 4 shows threaded element 42, and FIG. 1 shows threaded element 20. This threaded element must be of a material which is sufficiently pliable so that the primary insulator, which is typically a brittle material such as ceramic, does not fracture upon engagement with the threaded element. Additionally, to reduce manufacturing costs and to improve the ability of the threaded element to be manufactured, the material of the threaded element preferably has a low melting point.

After mounting the primary insulator on the threaded element, the assembled unit must be resistant to rotational and tensile forces. Such forces can be caused by movement, or galloping, of the power line as a result of wind, or sudden dropping of ice or snow from the power line, or other forces. Excessive rotational forces could inadvertently be applied to the unit during installation of the primary insulator on the threaded element. Finally, the threaded element is preferably self-lubricating or easily conforming to the contour of the internal insulator thread to facilitate installation of the primary insulator on the threaded element.

To meet these needs, lead has been used in the industry as the material for the threaded element. Lead has a low melting point, is pliable and is self-lubricating. However, lead has been listed as a hazardous material by the Environmental Protection Agency and other authorities. Therefore, there is reason to avoid the use of lead as a material for the threaded element.

As an alternative to lead, composite plastic materials have been used as the material for the threaded element. For example, FIG. 4 shows a known apparatus which includes plastic threaded element 42. In this known apparatus, coarse threading 44 is formed on the top of metal pin 41. Threaded element 42 is directly molded in place over coarse threading 44 of metal pin 41. Thus, after curing, threaded element 42 is held in place by the interlocking of coarse threading 44 and the corresponding threading formed at the inner surface of threaded element 42 during the molding and curing process.

Efforts have been made to develop threaded elements capable of being mounted on metal or fiberglass pins which do not have coarse threading formed thereon. One such effort involves forming a threaded element with an inner diameter which increases along its length from the top to the bottom of the threaded element. Such a threaded element would have a generally constant thickness along its length because the above-mentioned ANSI specification requires that the outer diameter of the threaded element also increase along its length from top to bottom. An adhesive resinous material is placed between the inner diameter of the threaded element and the outer surface of the pin. In such a system, the point of least resistance to an upward tensile force on the primary insulator (and thus on the threaded element) is the relatively weak bond between the threaded element and the epoxy.

There are various known methods for manufacturing a metal pin. These methods include metal casting, metal forging, and metal forming. Typically, steel is used as the metal. For example, a steel pin could be formed from carbon steel in accordance with ASTM-A-36 and hot-dipped galvanized steel according to ASTM-A-153 (class "B"). Metal forging results in a pin manufactured to close tolerances, while metal forming and casting result in a large variance of tolerances. Typically, further machining of a formed or cast steel pin is required prior to mounting a threaded element thereon. To date, there are no known successful methods for mounting a threaded element on a formed pin without any additional processing, such as machining or turning.

SUMMARY OF THE INVENTION

The present invention provides an apparatus and method for mounting a threaded element, which includes a threaded outer diameter for engaging a primary insulator for power lines, on a pin. The apparatus includes the pin, which has an outer peripheral surface. A threaded element surrounds a portion of the pin and includes an opened bottom end, a top end and a threaded outer diameter. The inner diameter of the threaded element decreases along its length from the top end to the bottom end, forming a gap defined by the outer peripheral surface of the pin and the inner diameter of the threaded element. An adhesive resinous material, capable of forming a strong bond with the pin, is permitted to cure and harden within the gap.

The method of the present invention includes placing the adhesive resinous material, such as epoxy, in the interior of the threaded element. Next, the pin is placed into the interior of the threaded element, thereby displacing the adhesive resinous material to the gap. Then, the adhesive resinous material is permitted to cure to form the strong bond with the pin.

According to another embodiment of the present invention, the threaded element includes a plurality of longitudinally-extending anti-rotation grooves. These grooves extend radially outward from the inner diameter of the threaded element. In one embodiment of the invention, the threaded element includes four such anti-rotation grooves.

The pin may be fiberglass or metallic, which are typically used. If metallic, the pin may be manufactured from any known method, including steel forming, without the need for further machining or turning. The pin also may be generally cylindrical. According to an embodiment of the invention, the pin is generally cylindrical and has an outer diameter which increases along its length from the top end to the bottom end.

In an embodiment of the method of the present invention, the threaded element includes an opened top end and, while placing the adhesive resinous material in the interior of the threaded element, the top end of the threaded element is placed on a flat surface of a material which can be easily removed from the cured adhesive resinous material. Alternatively, a plug is used to close the top end and provide a bearing surface against which the adhesive resinous material can cure. The plug can remain on or be removed from the completed unit of the present invention.

The threaded element of the present invention may be any composite plastic used for such applications. A lubricating powder, such as molybdenum sulfate, may be dispersed throughout the threaded element. Similarly, the method of the present invention may include the step of dispersing a lubricating powder, such as molybdenum sulfate, throughout the threaded element.

In an embodiment of the invention, the inner diameter of the threaded element forms an angle with the longitudinal axis of the threaded element of from about 1.3° to 2.0°.

BRIEF DESCRIPTION OF THE DRAWINGS

The invention is best understood from the following detailed description when read in connection with the accompanying drawings, in which.

DETAILED DESCRIPTION OF THE INVENTION

The present invention is a method and apparatus for mounting a threaded element onto a pin. The threaded element has an outer diameter adapted for engaging and supporting a primary insulator on which is mounted a power line (also known as a "conductor"), such as a transmission or distribution line. The threaded element of the present invention is suitable for use with primary insulators of a variety of sizes, types and voltage ratings, as long as the primary insulator has an internal thread capable of engaging with the outer threaded diameter of the threaded element, which has dimensions in accordance with the specifications of ANSI C 135.17 (1988).

Figure 1:
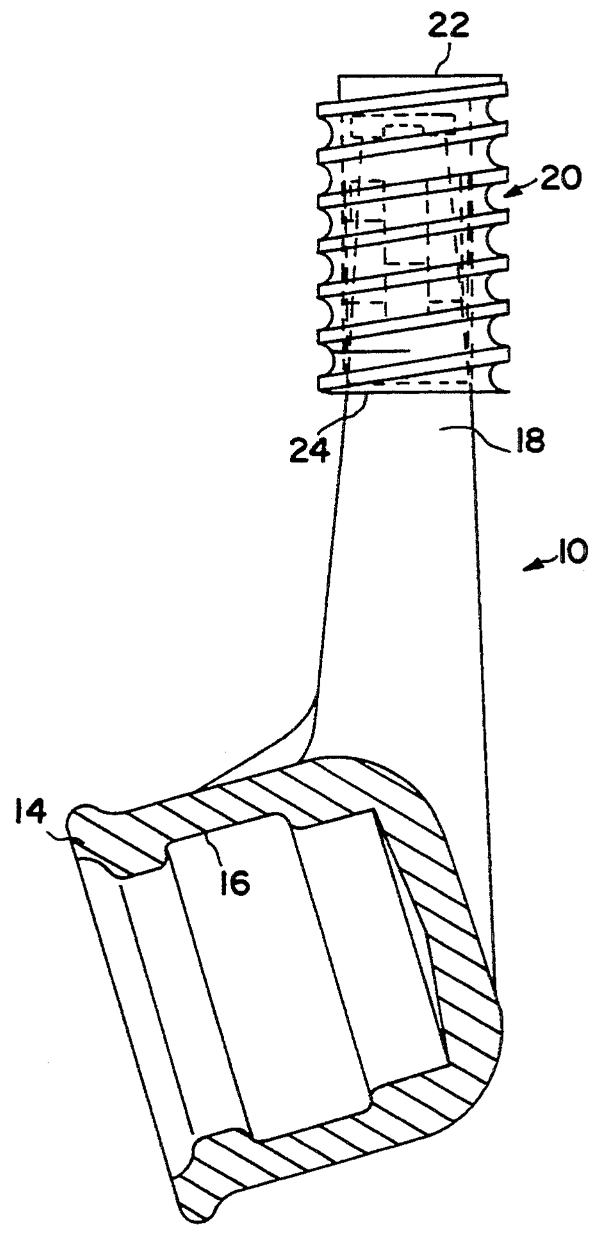
FIG. 1 is a partial cross sectional view of a pin and a threaded element of the present invention.

FIG. 1 shows a structure 10 (commonly known as a "cap") which, at one end, includes a bore 16 for engaging a rod (not shown) which can be mounted on a power line pole. Bore 16 is defined by perimeter 14. Cap 10 includes cast metal pin 18, on which is mounted a threaded element 20.

The threaded element of the present invention can be used with a wide variety of pins. As used herein, the term "pin" includes any conventionally used rod-like element adapted for insertion into the interior of a threaded element for a primary insulator. Known pins include brackets, spacers, attachments and the like.

Pins can be made of fiberglass or forged, cast or formed steel. In fact, any material can be used for the pin as long as the material bonds well with an adhesive resinous material, such that a strong bond is formed between the adhesive resinous material and the pin and such that this bond is stronger than the bond formed between the threaded element and the adhesive resinous material. If fiberglass, the pin may or may not include a metal portion over which the threaded element is formed. The threaded element of the present invention can be useful with a wide variety of pins, including pins having large variances in manufacturing tolerances.

Although the only pins shown have a circular cross-section, a variety of shapes of pins can be used including pins having a rectangular, square or oval cross-section. The only dimensional requirement of the pin is that its outer peripheral area fit within the interior of threaded element 22. According to an embodiment of the present invention (shown clearly in FIG. 2), the pin has a circular cross section (i.e. is generally cylindrical), but has a diameter which decreases from the bottom to the top.

The threaded element of the present invention may be any composite plastic used in applications of the present invention, such as a polycarbonate material or a nylon alloy material. The composite plastic material is preferably pliable and should have good mechanical properties at extreme temperature ranges. Preferably, a lubricating material in the form of a powder is dispersed during the injection molding process throughout the plastic threaded element. One such lubricating material is molybdenum sulfate. By dispersing a lubricating material throughout the plastic threaded element, the lubricating properties of the plastic are improved.

Figure 2:
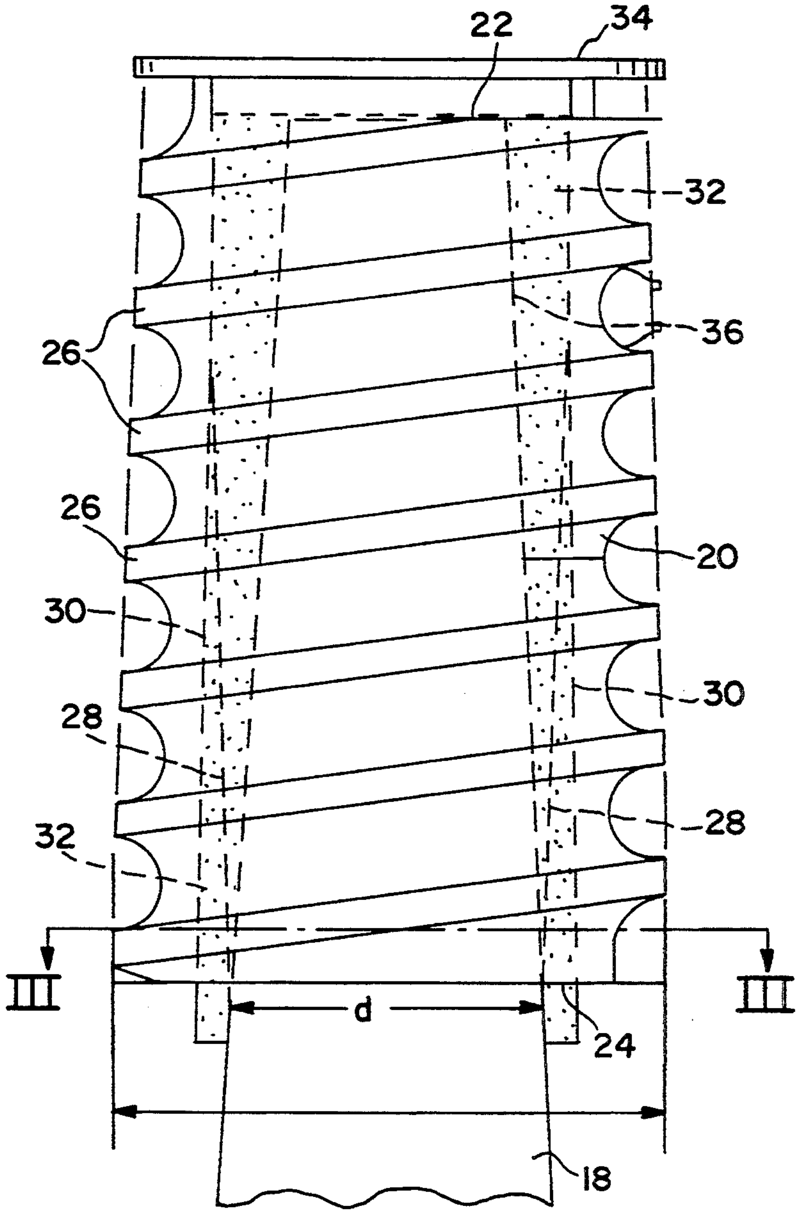
FIG. 2 is an enlarged partial cross sectional view showing the pin and a threaded element depicted in FIG. 1.

As shown in FIG. 2, threaded element 20 surrounds a portion of pin 18. In particular, the top portion of pin 18 is placed within the interior of threaded element 20. Threaded element 20 includes a top end 22, a bottom end 24 and a threaded outer diameter 26. The top end 22 of threaded element 20 may be opened or may include a cover or plug 34. Cover 34 should be of sufficient dimensions to close and seal the top end of the threaded element. The dimensions of the outer diameter 26 of threaded element 22 should be in accordance with the specifications of ANSI C 135.17 (1988) for either a one inch or one and three-eighths inch thread. With such dimensions, the thread is adapted for engaging a variety of primary insulators.

Inner diameter 28 of threaded element 22 decreases along the length of threaded element 20 from top end 22 to bottom end 24. Thus, a gap is formed between inner diameter 28 and the outer peripheral surface of pin 18. Such a gap has a triangular cross section. According to an embodiment of the invention, the angle formed by the inner diameter of the threaded element with the longitudinal axis of the threaded element ranges from about 1.3° to 2.0°. The limits to this range are primarily due to dimensional limitations caused by the outside dimensions of the threaded element as specified by the ANSI specification. In the examples of the present invention discussed below, the threaded element was about 1.75 inches in length from top to bottom, the inner diameter at the top was about 0.725 inches, and the inner diameter at the bottom was about 0.630 inches.

Figure 3:
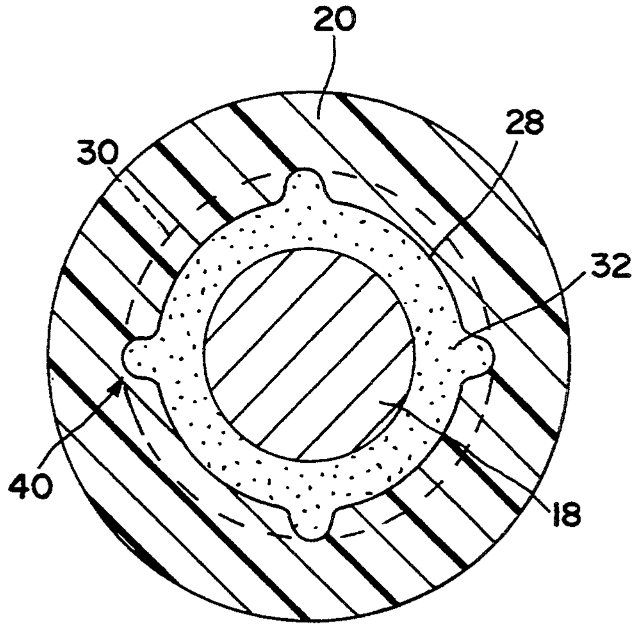
FIG. 3 is a cross sectional view taken along the line III—III of FIG. 2.
Figure 4:
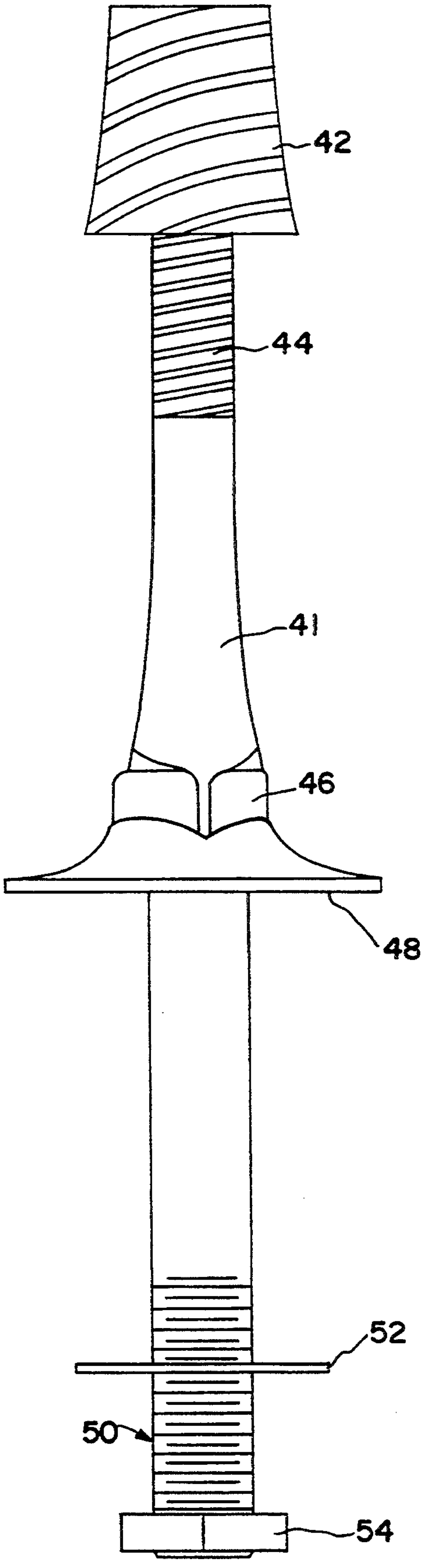
FIG. 4 PRIOR ART
FIG. 4 is a plan view of a conventional pin and a threaded element.

According to an embodiment of the present invention, the threaded element also includes a plurality of longitudinally-extending anti-rotation grooves 40, shown in FIG. 3. Anti-rotation grooves 40 extend radially outward from the inner diameter of threaded element 20. As shown in FIG. 3, four anti-rotation grooves can be formed on the threaded element. FIG. 2 shows the inner diameter 30 of the threaded element at an anti-rotation groove. As evident from FIG. 2, anti-rotation groove 40 extends radially outward to the same diameter along the length of threaded element 20. Near the top end 22 of threaded element 20, anti-rotation grooves 40 do not exist because of the increased inner diameter of the threaded element 20. In the examples discussed below, the threaded elements included four anti-rotation grooves which extended about 1 mm radially outward at the bottom of the threaded elements.

Threaded element 20 can be made in a known manner by plastic injection molding. In particular, plastic is injected into a mold capable of forming the outer diameter of threaded element 20 as required by the above-mentioned ANSI specification. After the plastic is injected, a mandrel is inserted into the mold and the plastic is permitted to cure. In one embodiment of the invention, the mandrel includes outwardly extending ribs for forming the anti-rotation grooves. After the plastic has cured, the mandrel is withdrawn through the top end 22 of threaded element 20. Then, threaded element 20 may be covered and sealed at its top end by a plug 34.

After obtaining the threaded element, the threaded element is turned upside down so that top end 22 is at the lowest vertical point. Then, an adhesive resinous material, such as epoxy, is poured into the interior of threaded element 20 through bottom end 24. If top end 22 is opened, the threaded element should be placed on a flat surface of a material which is easily removable from the cured adhesive resinous material. Alternatively, a plug 34 can be used to close and seal top end 22. In any event, threaded element 20 should be placed in some type of grip or vice so that it is aligned vertically during this process.

The adhesive resinous material, which can be either thermosetting or thermoplastic, can be any known adhesive resinous material capable of forming a strong bond with the material of the pin. In this sense, a "strong" bond is a bond having a minimum tensile shear resistance of 3100 lbs. and a minimum torsional resistance of 160 in-lbs. Furthermore, the adhesive resinous material must be chosen so that the bond between the pin and the adhesive resinous material is stronger than the bond between the threaded element and the adhesive resinous material.

The viscosity of the uncured adhesive resinous material should be such that the material is able to fill the entire gap between the pin and the threaded element upon placement of the pin in the threaded element. The cured adhesive resinous material should have a minimum compressive strength of 17,000 psi and a minimum hardness of 90 shore "D". The material is typically made from a resinous material mixed with a compatible activator. An epoxy which has been used successfully is standard bisphenol "A" diglycidyl ether.

The amount of adhesive resinous material should be sufficient to fill the gap between the inner diameter of the threaded element and the outer peripheral surface of the pin. Any excess adhesive resinous material can be scraped off after curing. In the examples discussed below, approximately ten to fourteen grams of the adhesive resinous material were used.

In the method of the present invention, after aligning the threaded element vertically, a pin is inserted through bottom end 24 into the interior of threaded element 22. The pin is then maintained in position by any conventional means, such as by a spring-loaded gripper, and the adhesive resinous material is permitted to cure. Curing times and temperatures vary depending on the particular adhesive resinous material. After curing, the adhesive resinous material has hardened within the gap and has formed a strong bond with the pin.

Referring again to FIG. 2, a triangular (by vertical cross-section) gap is formed between the inner diameter of threaded element 20 and the outer peripheral surface of pin 18. As previously mentioned, the adhesive resinous material forms a strong bond with the pin, but forms a relatively weak bond with the inner diameter of insulator thread 20. With a large tensile load applied to the insulator thread in the upward direction (caused, for example, by galloping of the transmission line which is attached to the primary insulator), the bond between the adhesive resinous material and the inner diameter of threaded element 20 will break. This permits a very slight movement in the upward direction of threaded element 20. As threaded element 20 moves upward, it interferes with the large end of the cured adhesive resinous material, thereby forming an interlock between the material and the insulator thread. This interlock resists further upward movement of threaded element 20.

Referring again to FIG. 3, anti-rotation grooves 40 resist relative rotation between pin 18 and threaded element 20. Relative rotation is resisted because the adhesive resinous material has hardened within anti-rotation grooves 40 and by virtue of the strong bond between the material and the pin.

In the embodiment of the invention wherein pin 18 is generally cylindrical and has a diameter which decreases from its bottom to top (shown in FIG. 2), an even greater amount of adhesive resinous material is formed near the top end of threaded element 20. This increased amount of adhesive resinous material contributes to the interlock between the adhesive resinous material and threaded element 20.

EXAMPLES

The following examples are included to more clearly demonstrate the overall nature of the invention. These examples are exemplary, not restrictive, of the invention.

Example 1

Torsion Test:

Eight 1" plastic threaded elements, the dimensions of which are mentioned above, were assembled in accordance with the present invention on fiberglass pole-top pins. A steel fixture, instead of a relatively brittle primary insulator, with a 1" insulator thread was used. The steel fixtures were torqued in accordance with ANSI 135.17 to 150 in-lbs. and then turned an additional 180°. The steel fixtures were then turned back 180°, and the torques required to again turn the steel fixtures were measured at:

| SAMPLE | 1 | 2 | 3 | 4 | 5 | 6 | 7 | 8 |
|---|---|---|---|---|---|---|---|---|
| TQ (in-lbs.) | 148 | 153 | 147 | 151 | 149 | 152 | 151 | 152 |

Tension Test:

The above samples were placed in a test fixture, and an axial load, in line with the axis of the threaded element, was applied. The ultimate tensile load, which is the tensile load at which the steel fixture is pulled off of the threaded element, in all cases exceeded the ANSI C 135.17 requirement of 3000 lbs.

| SAMPLE | 1 | 2 | 3 | 4 | 5 | 6 | 7 | 8 |
|---|---|---|---|---|---|---|---|---|
| U.T.L. (lbs.) | 3250 | 3400 | 3200 | 3350 | 3500 | 3400 | 3250 | 3450 |

Impact Test:

Five 1" threaded elements were installed on fiberglass pole-top pins and the threaded elements were subjected to twenty-five ft-lbs. of impact load using a four pound impact hammer at room temperature of 50° F. No significant damage was noticed on the threaded element. Porcelain insulators were installed on the 1" threaded elements subsequent to the impact test. Assemblies were torqued to 150 in-lbs. and then turned an additional 180°. No difficulties in installation of the insulators were noticed after the impact loads on the threaded elements.

These three series of tests prove that the threaded elements of the present invention meet ANSI C 135.17 thread integrity requirements.

Example 2

Water Soak Test:

Five samples of the threaded elements having the above-mentioned dimensions were placed in water for eighty hours. The threaded elements were then removed and were dried for a twenty-four hour period.

Post Water Soak Torsion Test:

Following the water soak test, the samples were subjected to the torsion test as explained in Example 1. The torques required to again turn the steel fixtures were measured at:

| SAMPLE | 1 | 2 | 3 | 4 | 5 |
|---|---|---|---|---|---|
| TQ (in-lbs) | 149 | 149 | 153 | 148 | 155 |

Post Water Soak Tension Test:

The above samples were then subjected to the tension test as explained in Example 1. The ultimate tensile loads (at room temperature of 65° F.) were:

| SAMPLE | 1 | 2 | 3 | 4 | 5 |
|---|---|---|---|---|---|
| Ultimate Tensile (lbs) | 3475 | 3300 | 3325 | 3550 | 3150 |

These tests prove that the threaded elements of the present invention meet ANSI C 135.17 thread integrity requirements after continued exposure to water and humidity.

Example 3

Heat Cycle Test:

Five samples of the threaded elements having the above-mentioned dimensions were assembled on fiberglass pole-top pins. The assembled units were then placed in a freezer having a temperature of −40° F. and an air-oven having a temperature of 170° F. subsequently for a total of 1000 cycles each approximately 10 minutes in duration.

Post-Temperature Cycle Torsion Test:

Following the heat/freezer cycles, the samples were subjected to the torsion test as explained in Example 1. The torques required to again turn the steel fixtures were measured at:

| SAMPLE | 1 | 2 | 3 | 4 | 5 |
|---|---|---|---|---|---|
| Torque (in-lbs) | 143 | 149 | 147 | 151 | 149 |

Post-Temperature Tension Test:

The above samples were then subjected to the tension test as explained in Example 1. The ultimate tensile loads (at room temperature of 65° F.) were:

| SAMPLE | 1 | 2 | 3 | 4 | 5 |
|---|---|---|---|---|---|
| Ultimate Tensile (lbs) | 3100 | 3275 | 3125 | 3200 | 3175 |

These tests prove that the threaded elements of the present invention meet ANSI C 135.17 thread integrity requirements after continued exposure to heat and freezing temperature cycles.

While this invention has been disclosed with reference to specific embodiments, it is apparent that other embodiments and equivalent variations of this invention may be devised by those skilled in the art without departing from the true spirit and scope of this invention. The claims are intended to be construed to include all such embodiments and equivalent variations.

What is claimed:

1. An apparatus for mounting a threaded element, for engaging an insulator, on a pin comprising:
   - a pin having an outer peripheral surface;
   - a threaded element, surrounding a portion of said pin, having:
     - (a) an opened bottom end;
     - (b) a top end;
     - (c) a threaded outer diameter; and
     - (d) an inner diameter which decreases along its length from the top end to the bottom end, forming a gap defined by the outer peripheral surface of said pin and the inner diameter of said threaded element; and
   - an adhesive resinous material hardened within said gap and forming a strong bond with said pin.

2. An apparatus in accordance with claim 1, wherein said threaded element further comprises a plurality of longitudinally-extending anti-rotation grooves, extending radially outward from the inner diameter of said threaded element.

3. An apparatus in accordance with claim 2, wherein said threaded element further comprises four anti-rotation grooves.

4. An apparatus in accordance with claim 1, wherein said pin is metallic.

5. An apparatus in accordance with claim 4, wherein said pin is formed steel.

6. An apparatus in accordance with claim 1, wherein said pin is fiberglass.

7. An apparatus in accordance with claim 1 further comprising a plug for closing the top end of said threaded element.

8. An apparatus in accordance with claim 1, wherein said pin is generally cylindrical and has an outer diameter which increases along its length from the top end to the bottom end.

9. An apparatus in accordance with claim 1, wherein said threaded element is plastic.

10. An apparatus in accordance with claim 9 further comprising a lubricating powder dispersed throughout said threaded element.

11. An apparatus in accordance with claim 1, wherein the inner diameter of said threaded element forms an angle with the longitudinal axis of said threaded element of from about 1.3° to 2.0°.

12. An apparatus in accordance with claim 1, wherein said adhesive resinous material is an epoxy resin.

13. A threaded element, which:

(a) has an opened bottom end, a top end, and a threaded outer diameter for engaging an insulator;

(b) is mounted on a pin having an outer peripheral surface; and (c) surrounds a portion of said pin, wherein the improvement comprises an inner diameter of said threaded element which decreases along its length from the top end to the bottom end, forming a gap defined by the outer peripheral surface of said pin and the inner diameter of said threaded element, and an adhesive resinous material hardened within said gap and forming a strong bond with said pin.

* * * * *